United States Patent
Svensson et al.

(10) Patent No.: US 12,279,550 B2
(45) Date of Patent: Apr. 22, 2025

(54) ROBOTIC LAWNMOWER WITH FOLDING MECHANISM AND LOCKING MECHANISM

(71) Applicant: HUSQVARNA AB, Huskvarna (SE)

(72) Inventors: Mats Svensson, Huskvarna (SE); Ronny Olsen, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 857 days.

(21) Appl. No.: 17/432,124

(22) PCT Filed: Feb. 11, 2020

(86) PCT No.: PCT/SE2020/050142
§ 371 (c)(1),
(2) Date: Aug. 19, 2021

(87) PCT Pub. No.: WO2020/171753
PCT Pub. Date: Aug. 27, 2020

(65) Prior Publication Data
US 2022/0183223 A1    Jun. 16, 2022

(30) Foreign Application Priority Data

Feb. 22, 2019    (SE) .................................... 1950231-9

(51) Int. Cl.
*A01D 34/00*    (2006.01)
*A01D 34/64*    (2006.01)
(Continued)

(52) U.S. Cl.
CPC ........... *A01D 34/008* (2013.01); *A01D 34/64* (2013.01); *A01D 2034/645* (2013.01);
(Continued)

(58) Field of Classification Search
CPC .... A01D 34/00–34/905; A01D 75/00–75/306; A01D 2034/645; A01B 59/00–59/069; A01B 63/00–63/32
See application file for complete search history.

(56) References Cited

U.S. PATENT DOCUMENTS 4,779,406 A    10/1988    Schroeder
5,816,035 A *  10/1998    Schick .................. A01D 34/74
                                                56/15.8
(Continued)

FOREIGN PATENT DOCUMENTS

CN    2898405 Y    5/2007
CN    202172592 U    3/2012
(Continued)

OTHER PUBLICATIONS

International Search Report and Written Opinion for International Application No. PCT/SE2020/050142 mailed Apr. 17, 2020.
(Continued)

*Primary Examiner* — Thomas B Will
*Assistant Examiner* — Madeline I Runco
(74) *Attorney, Agent, or Firm* — Burr & Forman LLP

(57) ABSTRACT

An autonomous robotic lawnmower (1) is disclosed. The robotic lawnmower (1) comprises a driving unit (3) comprising one or more drive wheels (5) and a cutting unit (7) arranged to cut grass when in a cutting position relative a ground surface (9). The lawnmower (1) further comprises a folding mechanism (11) allowing the cutting unit (7) to be pivoted relative the driving unit (3) around a pivot axis (ax) from the cutting position to a pivoted position.

19 Claims, 5 Drawing Sheets

(51) Int. Cl.
 *A01D 34/78* (2006.01)
 *A01D 34/82* (2006.01)
 *A01D 69/02* (2006.01)
 *A01D 101/00* (2006.01)

(52) U.S. Cl.
 CPC ............ *A01D 34/78* (2013.01); *A01D 34/824* (2013.01); *A01D 34/828* (2013.01); *A01D 69/02* (2013.01); *A01D 2101/00* (2013.01)

(56) References Cited

U.S. PATENT DOCUMENTS

| | | | |
|---|---|---|---|
| 5,927,055 | A | 7/1999 | Ferree et al. |
| 7,451,586 | B1 | 11/2008 | Papke et al. |
| 7,481,036 | B2 * | 1/2009 | Lilliestielke ......... A01D 34/662 56/15.9 |
| 9,642,297 | B2 * | 5/2017 | Nordquist .............. A01D 34/64 |
| 2008/0245044 | A1 * | 10/2008 | Shick ..................... A01D 34/74 56/14.9 |
| 2015/0189830 | A1 * | 7/2015 | Jagenstedt .............. B60L 53/16 901/1 |
| 2019/0254228 | A1 * | 8/2019 | Tate ..................... A01D 69/005 |

FOREIGN PATENT DOCUMENTS

| | | |
|---|---|---|
| CN | 103402351 A | 11/2013 |
| CN | 103696351 A | 4/2014 |
| CN | 204895717 U | 12/2015 |
| CN | 107846841 A | 3/2018 |
| CN | 207523869 U | 6/2018 |
| EP | 3193578 B1 | 11/2019 |
| GB | 2552331 A | 1/2018 |
| WO | 2014007729 A1 | 1/2014 |

OTHER PUBLICATIONS

Swedish Search Report for Application No. 1950231-9 mailed Sep. 12, 2019.

\* cited by examiner

ROBOTIC LAWNMOWER WITH FOLDING MECHANISM AND LOCKING MECHANISM

TECHNICAL FIELD

The present disclosure relates to an autonomous robotic lawnmower.

BACKGROUND

Autonomous robotic lawnmowers of different configurations are available on the market today which are capable of cutting grass in areas in an autonomous manner. Some robotic lawnmowers require a user to set up a border wire around a lawn that defines the area to be mowed. Such robotic lawnmowers use a sensor to locate the wire and thereby the boundary of the area to be trimmed. In addition to the wire, robotic lawnmowers may also comprise other types of positioning units and sensors, for example sensors for detecting an event, such as a collision with an object within the area.

A robotic lawnmower may comprise one or more batteries and one or more electric motors being powered by the one or more batteries. Some robotic lawnmowers comprise a photovoltaic module arranged to generate electricity from the sun's rays which may fully or partially provide an energy source for charging the one or more batteries. The robotic lawnmower may move in a systematic and/or random pattern to ensure that the area is completely cut. In some cases, the robotic lawnmower uses the wire to locate a recharging dock used to recharge the one or more batteries.

Generally, robotic lawnmowers operate unattended within the area in which they operate. During cutting, various components of the robotic lawnmower may be subjected to build-up of grass. Such build-up may deteriorate the cutting result of the robotic lawnmower and may obstruct a cutting unit of the robotic lawnmower. The removal of grass from a robotic lawnmower is burdensome and time-consuming and may be potentially dangerous if made in manner departing from instructions given by the manufacturer of the robotic lawnmower.

Moreover, on certain occasions, the robotic lawnmower may need to be serviced. As an example, after a certain operational time, cutting members of the robotic lawnmower might need replacement or sharpening. Correspondingly, such service procedures are burdensome, time-consuming and may be potentially dangerous if made in manner departing from instructions given by the manufacturer of the robotic lawnmower.

SUMMARY

It is an object of the present invention to overcome, or at least alleviate, at least some of the above-mentioned problems and drawbacks.

According to an aspect of the invention, the object is achieved by an autonomous robotic lawnmower comprising a driving unit comprising one or more drive wheels and a cutting unit arranged to cut grass when in a cutting position relative a ground surface. The lawnmower further comprises a folding mechanism allowing the cutting unit to be pivoted relative the driving unit around a pivot axis from the cutting position to a pivoted position.

Thereby, a robotic lawnmower is provided which significantly facilitates removal of grass from the cutting unit as well as significantly facilitates servicing of the cutting unit. This because a user wanting to remove grass from the cutting unit, or wanting to service the cutting unit, may pivot the cutting unit relative the driving unit from the cutting position to the pivoted position. Thereby, the user can in a simpler, safer, and more ergonomic manner reach portions of the cutting unit to remove grass, as well as to perform service of the cutting unit.

Moreover, since the robotic lawnmower comprises the folding mechanism, a robotic lawnmower is provided circumventing the need for lifting or tilting the robotic lawnmower when removing grass from the cutting unit, as well as when servicing the cutting unit. As a further result thereof, cleaning and servicing of the cutting unit can be made in a quicker manner and the risk of damages to the robotic lawnmower caused by lifting or tilting the robotic lawnmower is reduced.

Thus, a robotic lawnmower is provided in which cleaning and servicing of the cutting unit can be performed in a less burdensome manner, in a less time-consuming manner, in a more ergonomic manner, in a less harmful manner for the lawnmower, and in a safer manner.

Accordingly, a robotic lawnmower is provided overcoming, or at least alleviating, at least some of the above-mentioned problems and drawbacks. As a result, the above-mentioned object is achieved.

Optionally, the cutting unit is arranged to cut grass in a cutting plane, and wherein the pivot axis is transversal to a second plane being perpendicular to the cutting plane. Thereby, a robotic lawnmower is provided in which the cutting unit can be pivoted relative the driving unit to a pivoted position which may further facilitate removal of grass from the cutting unit as well as servicing of the cutting unit.

Optionally, the pivot axis is substantially parallel to the cutting plane. Thereby, a robotic lawnmower is provided in which the cutting unit can be pivoted relative the driving unit to a pivoted position which may further facilitate removal of grass from the cutting unit as well as servicing of the cutting unit. Moreover, pivoting of the cutting unit to and from the pivoted position can be facilitated.

Optionally, the pivot axis is substantially perpendicular to a forward direction of travel of the lawnmower. Thereby, a robotic lawnmower is provided in which the cutting unit can be pivoted relative the driving unit to a pivoted position which may further facilitate removal of grass from the cutting unit as well as servicing of the cutting unit. Moreover, pivoting of the cutting unit to and from the pivoted position can be facilitated.

Optionally, the folding mechanism allows the cutting unit to be pivoted relative the driving unit around the pivot axis with an angle exceeding 45 degrees. Thereby, a robotic lawnmower is provided in which the cutting unit can be pivoted relative the driving unit to a pivoted position which may further facilitate removal of grass from the cutting unit as well as servicing of the cutting unit.

Optionally, all wheels of the driving unit, which are arranged to abut against a ground surface, are arranged along one axis. Thereby, a robotic lawnmower is provided in which the cutting unit can be pivoted to and from the pivoted position in a simpler manner. This because the driving unit may pivot around the axis, and around abutment portions between the wheels and the ground surface, during pivoting of the cutting unit to and from the pivoted position.

Optionally, the folding mechanism is arranged such that the pivot axis is closer to the ground surface when the cutting unit is in the pivoted position than when the cutting unit is in the cutting position. Thereby, a robotic lawnmower is provided in which the cutting unit can be pivoted to and from the pivoted position in a simpler and less burdensome manner.

Optionally, the pivot axis is arranged closer to a rear end of the cutting unit than a front end of the cutting unit, seen in a forward direction of travel of the lawnmower. Thereby, the cutting unit can be pivoted to and from the pivoted position in a simpler and less burdensome manner.

Optionally, the lawnmower comprises a locking mechanism arranged to, in a locked state, lock the cutting unit in the cutting position, and in an unlocked state, allow the cutting unit to be pivoted relative the driving unit. Thereby, a robotic lawnmower is provided in which the cutting unit is securely held in the cutting position when the locking mechanism is in the locked state, and in which the cutting unit is allowed to be pivoted relative the driving unit when the locking mechanism is in the unlocked state.

Optionally, the locking mechanism is arranged at a distance from the pivot axis. Thereby, the cutting unit is securely held in the cutting position when the locking mechanism is in the locked state.

Optionally, the locking mechanism is arranged on a driving unit side of the pivot axis. Thereby, pivoting of the cutting unit to and from the cutting position is facilitated, as well as the procedure of locking and unlocking the locking mechanism. This because the locking mechanism will not be pivoted together with the cutting unit upon pivoting of the cutting unit.

According to embodiments herein, the lawnmower comprises an actuator operably connected to the locking mechanism to control the locking mechanism between the locked state and the unlocked state. Thereby, a robotic lawnmower is provided which can be used in a simpler and safer manner and the process of pivoting the cutting unit to and from the pivoted position is significantly facilitated. This because a user can control the locking mechanism between the locked state and the unlocked state in a simple and safe manner.

Optionally, the actuator is operably connected to the locking mechanism in a manner causing the locking mechanism to be transferred from the locked state to the unlocked state when a force is applied onto the actuator in a direction coinciding with a forward direction of travel of the lawnmower. Thereby, the risk of unintended displacements of the actuator to the unlocked state is reduced. This because if the robotic lawnmower is travelling in the forward direction of travel into an object, such as a branch, garden furniture, or the like, the object will apply a force onto the actuator in a direction coinciding with a locking direction of the actuator.

Optionally, the lawnmower comprises a driving unit chassis and a cutting unit chassis, and wherein the locking mechanism comprises a locking member arranged on one of the driving unit chassis and the cutting unit chassis, wherein the locking member is arranged to abut against an engagement portion of the other of the driving unit chassis and the cutting unit chassis when the locking mechanism is in the locked state. Thereby, a simple, efficient, and reliable locking mechanism is provided. Moreover, as is further explained herein, conditions are provided for a locking mechanism capable of assisting the movement between the cutting unit chassis and the driving unit chassis upon displacement of the cutting unit to and from the cutting position.

Optionally, the locking member comprises a hook. Thereby, a simple, efficient, and reliable locking mechanism is provided. Furthermore, engagement between the locking member and the engagement portion can be further ensured. Moreover, as is further explained herein, conditions are provided for a locking mechanism capable of causing movement of the cutting unit to and from the cutting position upon actuation of the locking mechanism.

Optionally, the locking member is arranged on the driving unit chassis. Thereby, pivoting of the cutting unit to and from the cutting position is facilitated, as well as the procedure of locking and unlocking the locking mechanism. This because the locking member will not be pivoted together with the cutting unit upon pivoting of the cutting unit.

Optionally, the locking mechanism is arranged to cause a movement of the locking member from the engagement portion upon displacement of the actuator in an unlocking direction. Thereby, a simple, efficient, and reliable locking mechanism is provided.

Optionally, the locking mechanism comprises a spring element arranged to bias the locking member towards the engagement portion. Thereby, engagement between the locking member and the engagement portion is further ensured. Moreover, the locking mechanism is less likely to be put into the unlocked state unintendedly.

Optionally, the locking mechanism is arranged to cause a movement of the locking member towards the engagement portion upon displacement of the actuator in a locking direction. Thereby, engagement between the locking member and the engagement portion can be obtained simply by displacing the actuator in the locking direction.

Optionally, the locking mechanism is arranged to pivot the cutting unit from a partially pivoted position to the cutting position when the actuator is displaced in a locking direction to a locking position. Thereby, a user can pivot the cutting unit to the cutting position simply by applying a force onto the actuator in the locking direction. As a result, the need for lifting the cutting unit by grabbing portions thereof is circumvented. Accordingly, due to these features, the user can pivot the cutting unit to the cutting position in a simpler and more ergonomic manner.

Optionally, the locking mechanism comprises an eccentric, and wherein the actuator is operably connected to the locking member via the eccentric. Thereby, a user can displace the locking mechanism between the locked and unlocked states using less force than would be required otherwise.

Optionally, the actuator is rigidly attached to the eccentric. Thereby, a simple, efficient, and reliable locking mechanism is provided.

Optionally, the locking mechanism comprises a press element against which the eccentric is arranged to press. The eccentric may comprise a flat surface arranged to abut against the press element when the actuator is in a locking position. Thereby, the actuator is more securely held in the locking position and more force is required for displacing the actuator from the locking position than what is required for displacing the actuator to the locking position.

Optionally, the locking mechanism comprises a press element against which the eccentric is arranged to press, and wherein the press element is spring biased towards the eccentric. Thereby, a dampening effect can be provided between the driving unit and the cutting unit when the locking mechanism is in the locked state. In addition, since the press element is spring biased towards the eccentric, the occurrence of play in the locking mechanism is reduced and the impact of tolerances of components of the lawnmower is reduced. As a further result thereof, the actuator can be displaced to control the locking mechanism between the locked state and the unlocked state using less force.

Optionally, the lawnmower comprises a sensor arranged to generate a signal indicating whether the cutting unit is in the cutting position. Thereby, a simple, safe, and reliable detection can be provided of whether the cutting unit is in the cutting position or not.

Optionally, the lawnmower comprises a control unit configured to control operation of the cutting unit, wherein the control unit is configured to render the cutting unit inoperable when the cutting unit is not in the cutting position. Thereby, the safety during handling of the lawnmower is significantly improved. This because a user can in a safe manner remove grass from the cutting unit and perform service to the cutting unit when the cutting unit is in the pivoted position.

Optionally, the lawnmower comprises at least one support arm arranged to abut against a ground surface when the cutting unit is in an at least partially pivoted position. Thereby, handling of the lawnmower is facilitated. Moreover, the risk of damages to the lawnmower during pivoting of the cutting unit is reduced.

Optionally, the at least one support arm is arranged on the cutting unit. Thereby, pivoting of the cutting unit to and from the pivoted position is facilitated.

Optionally, the support arm is arranged to abut against the ground surface during pivoting of the cutting unit from a partially pivoted position to the pivoted position. Thereby, pivoting of the cutting unit to and from the pivoted position is further facilitated. This because the cutting unit is supported by the support arm against the ground surface during pivoting of the cutting unit.

Optionally, the at least one support arm comprises a wheel. Thereby, pivoting of the cutting unit to and from the pivoted position is further facilitated.

Optionally, the at least one support arm is arranged to abut against the ground surface when the cutting unit is in the pivoted position to prevent the cutting unit from being displaced from the pivoted position. Thereby, handling of the lawnmower is further facilitated. Moreover, the risk of damages to the lawnmower is reduced. In addition, removal of grass and servicing of the cutting unit can be performed in a simpler and safer manner.

According to some embodiments, the support arm may prevent the cutting unit from being displaced from the pivoted position by abutting against a portion of the ground surface in front of the pivot axis when the cutting unit is in the pivoted position. Moreover, the support arm may prevent the cutting unit from being displaced from the pivoted position by abutting against the ground surface at a position, when the cutting unit is in the pivoted position and when the lawnmower is positioned in an upright position on a horizontal ground surface, ensuring that a centre of gravity of the cutting unit is between the pivot axis and the abutment position between the support arm and the ground surface. Furthermore, according to some embodiments, the weight and the centre of gravity of the driving unit and the weight and the centre of gravity of the cutting unit are adapted such that the cutting unit is stabilized in the pivoted position, when the lawnmower is positioned in an upright position on a horizontal ground surface with the cutting unit in the pivoted position. Moreover, according to some embodiments, the weight and the centre of gravity of the driving unit and the weight and the centre of gravity of the cutting unit are adapted such that the cutting unit is forced towards the pivoted position, when the lawnmower is positioned in an upright position on a horizontal ground surface with the cutting unit in the pivoted position, and/or with the cutting unit in a position close to the pivoted position. In this manner, pivoting of the cutting unit to the pivoted position can be further facilitated and the cutting unit can be further stabilized when in the pivoted position.

Optionally, the lawnmower comprises one or more spring elements arranged to bias the cutting unit from a partially pivoted position towards the pivoted position. Thereby, the cutting unit can be pivoted from the partially pivoted position towards the pivoted position in a simpler and safer manner, using less force than would be required otherwise.

Optionally, the one or more spring elements are further arranged to bias the cutting unit from the partially pivoted position towards the cutting position. Thereby, the cutting unit can be pivoted from the partially pivoted position towards the cutting position in a simpler and safer manner, using less force than would be required otherwise.

Optionally, the lawnmower comprises a handle arranged on a front portion of the cutting unit. Thereby, handling of the lawnmower is further facilitated, and the cutting unit can be pivoted to and from the pivoted position in a simpler, safer, and more ergonomic manner.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
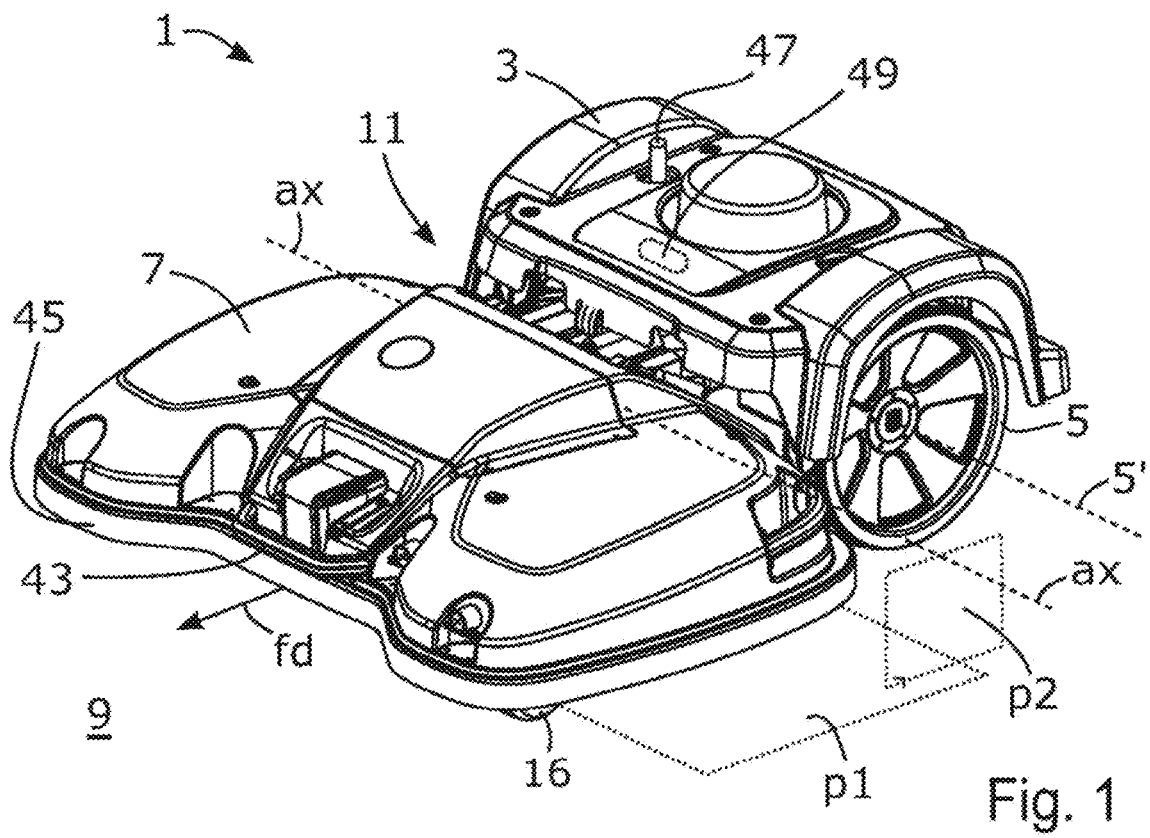
FIG. 1 illustrates an autonomous robotic lawnmower, according to some embodiments.

FIG. 1 illustrates an autonomous robotic lawnmower 1 according to some embodiments. According to the illustrated embodiments, the lawnmower 1 is a self-propelled autonomous robotic lawnmower 1 capable of navigating and cutting grass in areas in an autonomous manner without intervention of a user. The robotic lawnmower 1 may be configured to be used to cut grass in areas used for aesthetic and recreational purposes, such as gardens, parks, city parks, sports fields, lawns around houses, apartments, commercial buildings, offices, and the like. According to the illustrated embodiments, the lawnmower 1 has a large cutting capacity, is large in size, and is specifically adapted to cut grass in bigger areas, such as football pitches. For the reason of brevity and clarity, the autonomous robotic lawnmower 1 is in some places herein referred to as "the lawnmower 1".

The lawnmower 1 comprises a driving unit 3. According to the illustrated embodiments, the driving unit 3 comprises two drive wheels 5 each driven by an electric motor arranged in the driving unit 3.

The lawnmower 1 comprises at least one sensor 47 and a control unit 49. The control unit 49 is configured to control operation of the driving unit 3, based on data from the at least one sensor 47, to navigate the lawnmower 1 in an area. The control unit 49 is configured to control operation of the driving unit 3 by controlling electrical motors arranged to rotate the drive wheels 5. In this manner, the lawnmower 1 can be steered and navigated in an autonomous manner in an area without intervention of a user.

The lawnmower 1 further comprises a cutting unit 7 arranged to cut grass when in a cutting position relative a ground surface 9. In FIG. 1 the cutting unit 7 is illustrated in the cutting position. The cutting unit 7 is arranged to cut grass in a cutting plane p1. As can be seen in FIG. 1, the cutting plane p1 is substantially parallel to the ground surface 9.

The lawnmower 1 comprises a folding mechanism 11 allowing the cutting unit 7 to be pivoted relative the driving unit 3 around a pivot axis ax from the cutting position to a pivoted position.

Figure 2:
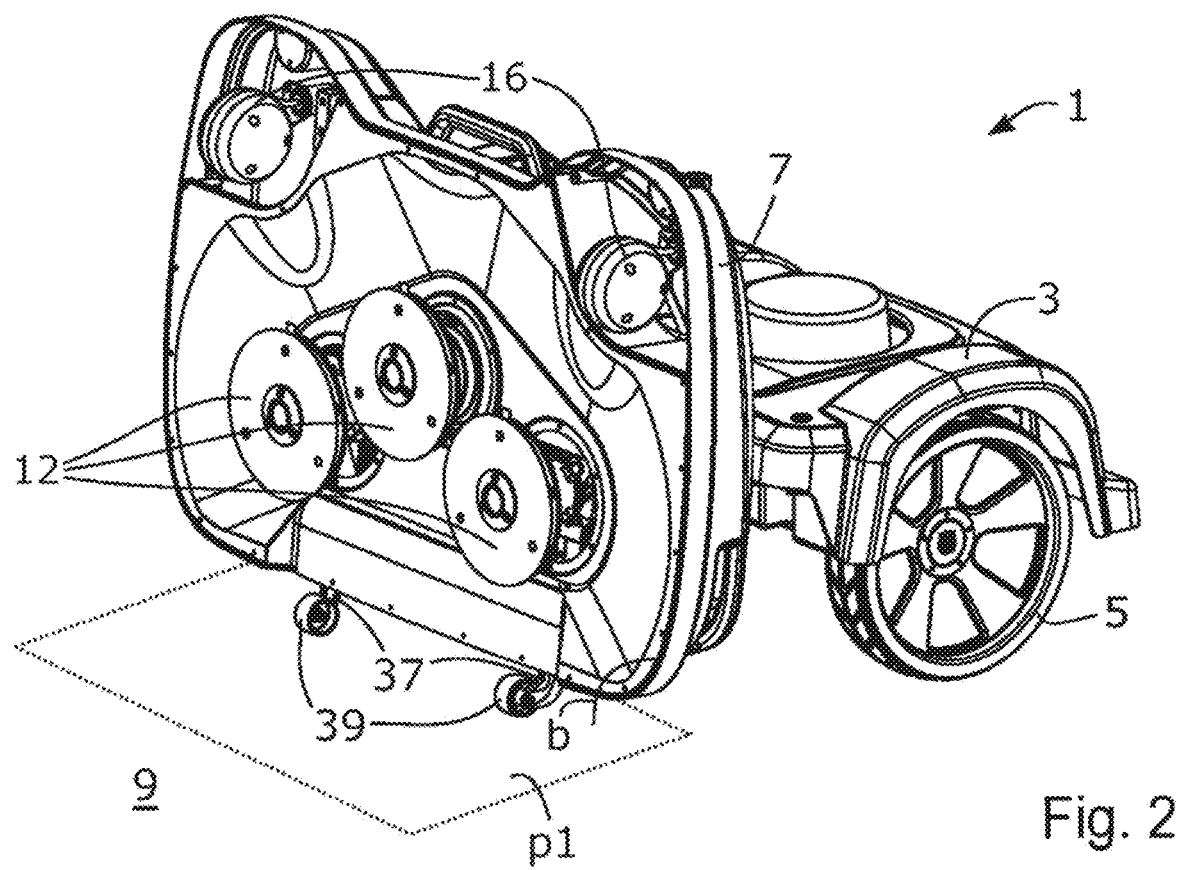
FIG. 2 illustrates the lawnmower illustrated in FIG. 1 with a cutting unit in a pivoted position.

FIG. 2 illustrates the lawnmower 1 illustrated in FIG. 1 with the cutting unit 7 in the pivoted position. As can be seen in FIG. 2, the pivoted position constitutes a position in which the cutting unit 7 is pivoted relative the ground surface 9. In this manner, a user can reach portions of the cutting unit 7 in a simpler, safer, and more ergonomic manner, for example when removing grass or performing service of the cutting unit 7. As indicated in FIG. 1, the pivot axis ax is transversal to a second plane p2. The second plane p2 is perpendicular to the cutting plane p1. The pivot axis ax may form an angle of at least 45 degrees with the second plane p2. According to the illustrated embodiments, the pivot axis ax form an angle of 90 degrees with the second plane p2. Moreover, according to the illustrated embodiments, the pivot axis ax is substantially parallel to the cutting plane p1 and the pivot axis ax is substantially perpendicular to a forward direction fd of travel of the lawnmower 1.

According to the illustrated embodiments, the folding mechanism 11 allows the cutting unit 7 to be pivoted relative the driving unit 3 around the pivot axis ax with an angle b of approximately 100 degrees. According to further embodiments, the folding mechanism 11 may allow the cutting unit 7 to be pivoted relative the driving unit 3 around the pivot axis ax with an angle b within the range of 45-165 degrees, or 90-125 degrees.

Moreover, as can be seen in FIG. 2, the cutting unit 7 comprises a number of cutting members 12 arranged to cut grass when the cutting unit 7 is in the cutting position. According to the illustrated embodiments, the cutting unit 7 comprises three cutting members 12 in the form of cutting discs. According to further embodiments, the cutting unit 7 may comprise another number of cutting members 12, and another type of cutting members 12, such as one or more cutting arms.

Moreover, as can be seen in FIG. 2, the cutting unit 7 comprises two supporting wheels 16, i.e. non-driven wheels. As indicated in FIG. 1, the supporting wheels 16 are arranged to abut against the ground surface 9 when the cutting unit 7 is in the cutting position. The supporting wheels 16 supports the cutting unit 7 during cutting and ensures that a certain distance is obtained between the ground surface 9 and the cutting members 12 of the cutting unit 7.

The drive wheels 5 are arranged along one axis 5'. The driving unit 3 comprises no further wheels than the two drive wheels 5. Thus, according to the illustrated embodiments, all wheels 5 of the driving unit 3 which are arranged to abut against a ground surface 9 are arranged along one axis 5'. As is further explained herein, this facilitates pivoting of the cutting unit 7 between the cutting position and the pivoted position.

Figure 3:
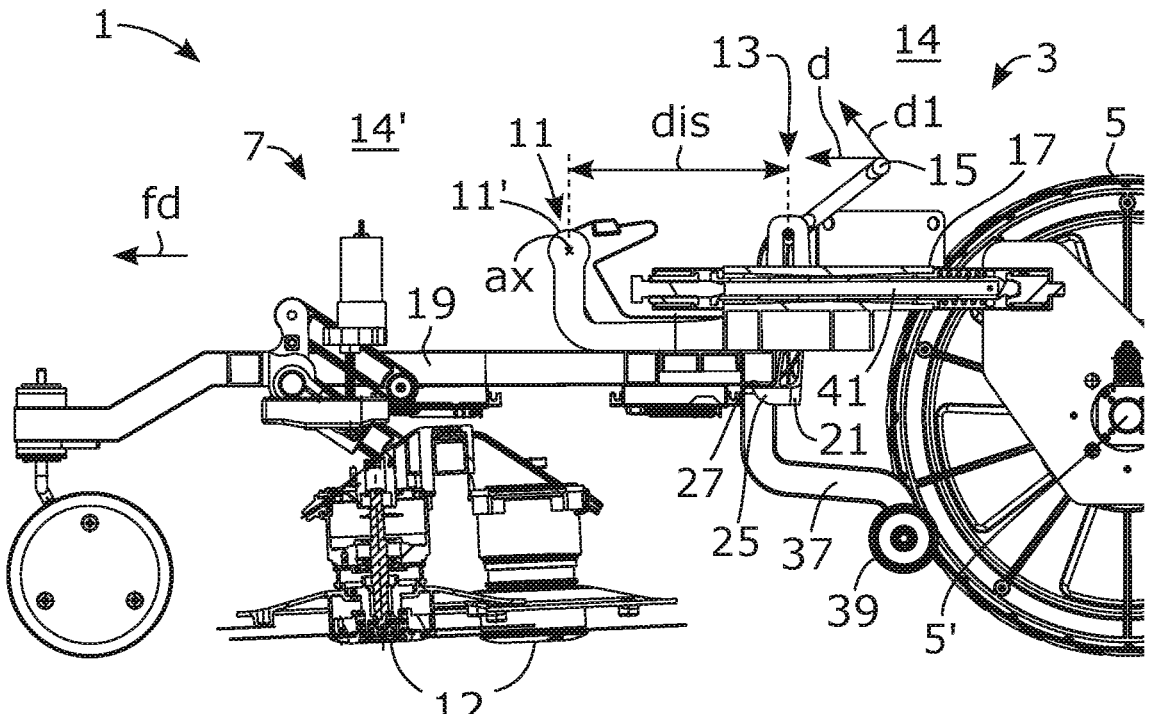
FIG. 3 illustrates a cross section of the lawnmower illustrated in FIG. 1, with some components removed for the reason of brevity and clarity.

FIG. 3 illustrates a cross section of the lawnmower 1 illustrated in FIG. 1, with some components removed for the reason of brevity and clarity. As is evident from FIG. 3, the lawnmower 1 comprises a driving unit chassis 17 and a cutting unit chassis 19. The driving unit chassis 17 form part of the driving unit 3 and is arranged to support components of the driving unit 3. The cutting unit chassis 19 form part of the cutting unit 7 and is arranged to support components of the cutting unit 7.

Moreover, as is evident from FIG. 3, the folding mechanism 11 comprises a hinge 11' between the driving unit chassis 17 and cutting unit chassis 19 allowing the cutting unit chassis 19, and thus also the cutting unit 7, to be pivoted relative the driving unit 3 around the pivot axis ax.

The lawnmower 1 comprises a locking mechanism 13 arranged to, in a locked state, lock the cutting unit 7 in the cutting position, and in an unlocked state, allow the cutting unit 7 to be pivoted relative the driving unit 3. In FIG. 3, the cutting unit 7 is illustrated in the cutting position and the locking mechanism 13 is illustrated in the locked state.

As can be seen in FIG. 3, the locking mechanism 13 is arranged at a distance dis from the pivot axis ax. According to some embodiments, the distance dis is greater than 5% of the length of the lawnmower 1 measured in the fd of travel of the lawnmower 1. In this manner, the cutting unit 7 can be more securely locked in the cutting position, and as is further explained therein, displacement of the cutting unit 7 to and from the cutting position can be facilitated. The locking mechanism 13 is arranged on a driving unit side 14 of the pivot axis ax, which is opposite to a cutting unit side 14' of the of the pivot axis ax. Moreover, as can be seen in FIG. 3 and in FIG. 1, the folding mechanism 11 and the pivot axis ax are arranged closer to a rear end of the cutting unit 7 than a front end 45 of the cutting unit 7, seen in a forward direction fd of travel of the lawnmower 1. Thereby, the cutting unit 7 can be pivoted to and from the pivoted position in a simpler and less burdensome manner.

The lawnmower 1 comprises an actuator 15 in the form of a lever. The actuator 15 is operably connected to the locking mechanism 13 to control the locking mechanism 13 between the locked state and the unlocked state. The actuator 15 is operably connected to the locking mechanism 13 in a manner causing the locking mechanism 13 to be transferred from the locked state to the unlocked state when a force is applied onto the actuator 15 in a direction d coinciding with a forward direction fd of travel of the lawnmower 1. In this manner, unintended displacements of the actuator 15 are avoided for example when the lawnmower 1 is travelling in the forward direction fd of travel into an object, such as a branch, garden furniture, or the like.

According to the illustrated embodiments, the locking mechanism 13 comprises a locking member 21 arranged on the driving unit chassis 17. The locking member 21 is arranged to abut against an engagement portion 27 of the cutting unit chassis 19 when the locking mechanism 13 is in the locked state. Moreover, according to the illustrated embodiments, the locking member 21 comprises a hook 25.

The locking mechanism 13 is arranged to cause a movement of the locking member 21 from the engagement portion 27 of the cutting unit chassis 19 upon displacement of the actuator 15 in an unlocking direction d1.

Figure 4:
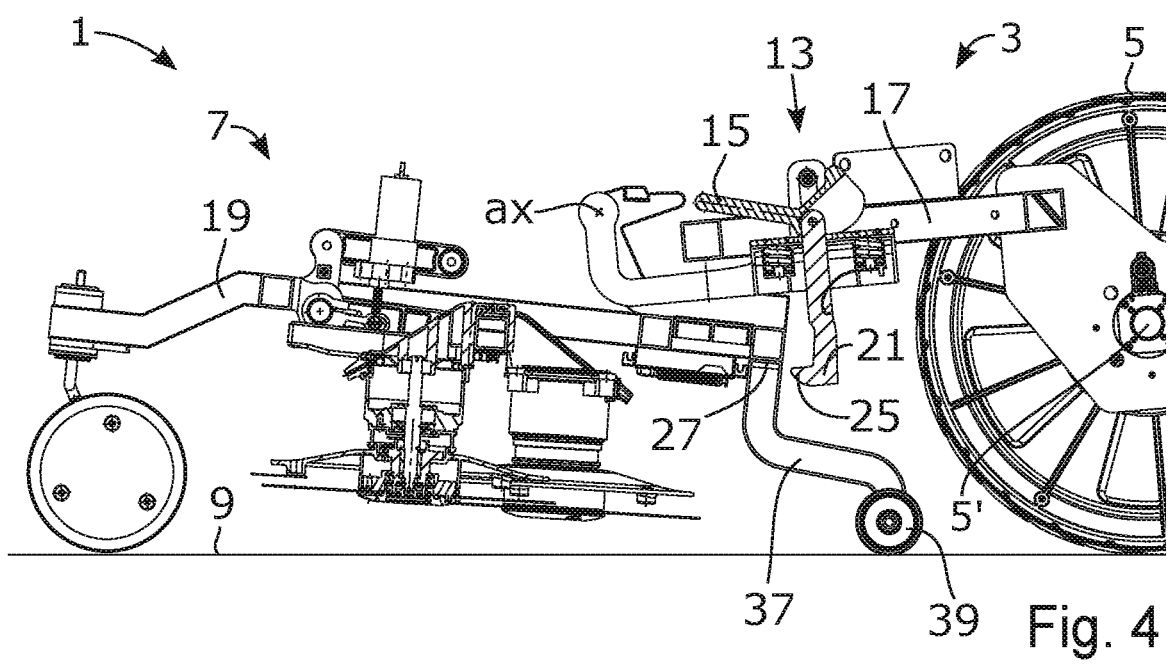
FIG. 4 illustrates the lawnmower illustrated in FIG. 3, where an actuator of the lawnmower has been fully displaced in an unlocking direction.

FIG. 4 illustrates the lawnmower 1 illustrated in FIG. 3 where the actuator 15 has been fully displaced in the unlocking direction d1. As a result of the displacement of the actuator 15, the locking member 21 has been moved from the engagement portion 27 of the cutting unit chassis 19 by the locking mechanism 13. As a result, the cutting unit 7 is allowed to be pivoted relative the driving unit 3 around the pivot axis ax from the cutting position to a partially pivoted position.

As can be seen in FIG. 4, the lawnmower 1 comprises a support arm 37 arranged to abut against a ground surface 9 when the cutting unit 7 is in the partially pivoted position. The support arm 37 is a support arrangement 37 configured to abut against the ground surface 9 when the cutting unit 7 is in the partially pivoted position. Therefore, throughout this disclosure, the wording "support arm 37" may be replaced with the wording "support arrangement 37". The support arm 37 is arranged on the cutting unit 7 and comprises a wheel 39 arranged to abut against the ground surface 9 when the cutting unit 7 is in the partially pivoted position. The lawnmower 1 may comprise two support arms 37, which is the case according to the illustrated embodiments, see for example FIG. 2. Moreover, as is evident from FIG. 3, the support arm 37 and the wheel 39 are each arranged to stay clear from the ground surface when the cutting unit 7 is in the cutting position.

Figure 5:
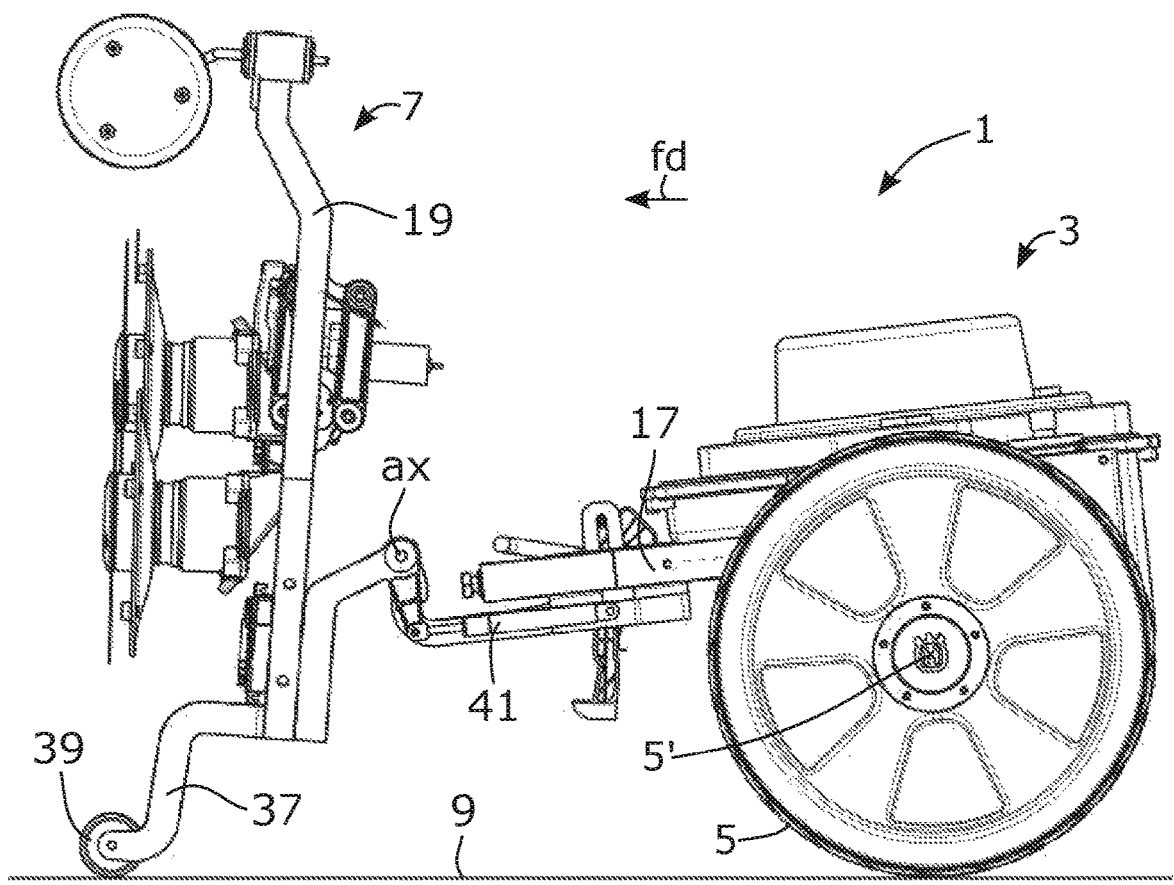
FIG. 5 illustrates the lawnmower illustrated in FIG. 4, where the cutting unit has been pivoted to the pivoted position.

FIG. 5 illustrates the lawnmower 1 illustrated in FIG. 4 where the cutting unit 7 has been pivoted to the pivoted position. The pivoted position, as referred to herein, may also be referred to as "the fully pivoted position". The lawnmower 1 may comprise one or more stop arrangements arranged to hinder pivoting of the cutting unit 7 past the pivoted position. Such one or more stop arrangements may for example comprise a protrusion arranged on one of the driving unit chassis 17 and the cutting unit chassis 19 arranged to abut against a portion of the other of the driving unit chassis 17 and the cutting unit chassis 19, when the cutting unit 7 is in the pivoted position, so as to hinder pivoting of the cutting unit 7 past the pivoted position. According to some embodiments, the one or more stop arrangements is/are integrated in the hinge 11' indicated in FIG. 3.

The wheel 39 of the support arm 37 is arranged to abut against the ground surface 9 during the full movement of the cutting unit 7 from the partially pivoted position, illustrated in FIG. 4, to the pivoted position, illustrated in FIG. 5. In this manner, the pivoting of the cutting unit 7 is facilitated. Moreover, as indicated in FIG. 1, the lawnmower 1 comprises a handle 43 arranged on a front portion 45 of the cutting unit 7. The handle 43 facilitates the procedure of pivoting of the cutting unit 7 to and from the pivoted position.

Moreover, as can be seen in FIG. 5, the wheel 39 of the support arm 37 is arranged to abut against the ground surface 9 when the cutting unit 7 is in the pivoted position to prevent the cutting unit 7 from being displaced from the pivoted position. According to the illustrated embodiments, the support arm 37 prevents the cutting unit 7 from being displaced from the pivoted position by abutting against a portion of the ground surface 9 in front of the pivot axis ax when the cutting unit 7 is in the pivoted position. Moreover, according to the illustrated embodiments, the support arm 37 prevents the cutting unit 7 from being displaced from the pivoted position because a centre of gravity of the cutting unit 7 is between the pivot axis ax and the abutment position between the support arm 37 and the ground surface 9. Thus, according to the illustrated embodiments, the wheel 39 of the support arm 37 is arranged to abut against the ground surface 9 at a position, when the cutting unit 7 is in the pivoted position and when the lawnmower 1 is positioned in an upright position on a horizontal ground surface 9, ensuring that a centre of gravity of the cutting unit 7 is between the pivot axis ax and the abutment position between the wheel 39 and the ground surface 9.

As mentioned, the drive wheels 5 are arranged along one axis 5' and the driving unit 3 comprises no further wheels arranged to abut against a ground surface 9 than the two drive wheels 5. Moreover, the pivot axis ax is substantially parallel to the axis 5' of the drive wheels 5. This is advantageous because the driving unit 3 is allowed to pivot around the axis 5' of the drive wheels 5, as well as around abutment positions between the drive wheels 5 and the ground surface 9, upon pivoting of the cutting unit 7. As can be seen when comparing FIG. 3 and FIG. 4, the driving unit 3 is allowed to pivot around the axis 5' of the drive wheels 5, as well as around abutment positions between the drive wheels 5 and the ground surface 9, when the cutting unit 7 is pivoted to and from the cutting position, i.e. when the cutting unit 7 is pivoted between the cutting position and partially pivoted position and vice versa. Moreover, as can be seen when comparing FIG. 4 and FIG. 5, the driving unit 3 is allowed to pivot around the axis 5' of the drive wheels 5, as well as around abutment positions between the drive wheels 5 and the ground surface 9, when the cutting unit 7 is pivoted to and from the pivoted position, i.e. when the cutting unit 7 is pivoted between the partially pivoted position and the pivoted position and vice versa.

Thus, according to the illustrated embodiments, the pivot axis ax is allowed to move relative the ground surface 9 when pivoting the cutting unit 7 between the cutting position and the pivoted position. As can be seen when comparing FIG. 3, FIG. 4, and FIG. 5, the pivot axis ax is closer to the ground surface 9 when the cutting unit 7 is in the pivoted position and when the cutting unit 7 is in the partially pivoted position, than when the cutting unit 7 is in the cutting position. Thus, according to the illustrated embodiments, the driving unit 3, the cutting unit 7, and the folding mechanism 11 are arranged such that the pivot axis ax is closer to the ground surface 9 when the cutting unit 7 is in the pivoted position, and when the cutting unit 7 is in the partially pivoted position, than when the cutting unit 7 is in the cutting position.

According to further embodiments of the present disclosure, the driving unit 3 may comprise more than two wheels 5 arranged to abut against a ground surface 9 during operation of the lawnmower 1, which wheels may be arranged along more than one axis, such as along two axes. For example, the driving unit 3 may comprise three wheels, or four wheels, which may all be driven wheels. Moreover, according to some embodiments of the present disclosure, the driving unit 3 may comprise a continuous track drive aggregate, also called tank tread drive aggregate, or caterpillar track drive aggregate. According to such embodiments, the "drive wheel" as referred to herein may comprise a drive wheel arranged to drive a continuous track of such a continuous track drive aggregate.

Figure 6:
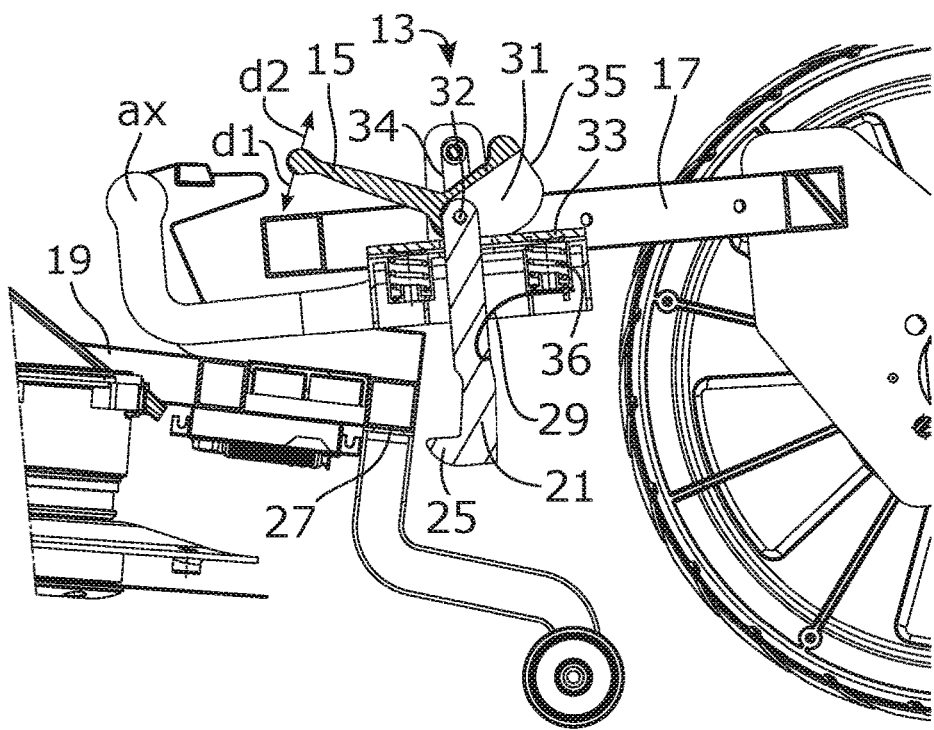
FIG. 6 illustrates an enlarged view of a locking mechanism of the lawnmower illustrated in FIG. 4.

FIG. 6 illustrates an enlarged view of the locking mechanism 13 of the lawnmower 1 illustrated in FIG. 4. In FIG. 6, the actuator 15 is fully displaced in the unlocking direction d1. As indicated in FIG. 6, the locking mechanism 13 comprises an eccentric 31. The eccentric 31 may also be referred to as an excentre. The actuator 15 is operably connected to the locking member 21 via the eccentric 31. According to the illustrated embodiments, the locking mechanism 13 comprises a groove 34 arranged on the driving unit chassis 17 and a shaft 32 slidably arranged in the groove 34. According to the illustrated embodiments, the groove 34 is formed as a slot 34. Therefore, throughout this disclosure, the wording "groove 34" may be replaced with the wording "slot 34". The actuator 15 is rigidly attached to the eccentric 31. The actuator 15 and the eccentric 31 are pivotally arranged to the shaft 32. Thus, according to the illustrated embodiments, the actuator 15 and the eccentric 31 are pivotally arranged to the driving unit chassis 17, via the shaft 32. The locking member 21 is also pivotally arranged to the shaft 32. According to the illustrated embodiments, the groove 34 extends in a direction which allows the shaft 32 to move in directions in the groove 34 substantially perpendicular to the cutting plane of the cutting unit 7, when the cutting unit is in the cutting position. With other words, the groove 34 extends in a direction which allows the shaft 32 to move in directions in the groove 34 substantially perpendicular to the forward direction fd of travel of the lawnmower 1 when the cutting unit 7 is in the cutting position.

The locking mechanism 13 comprises a press element 33 against which the eccentric 31 is arranged to press. According to the illustrated embodiments, the press element 33 is a press plate. The press element 33 is spring biased towards the eccentric 31 by a set of springs 36. The locking mechanism 13 comprises a spring element 29 arranged to bias the locking member 21 in a direction towards the engagement portion 27 of the cutting unit chassis 19.

Figure 7:
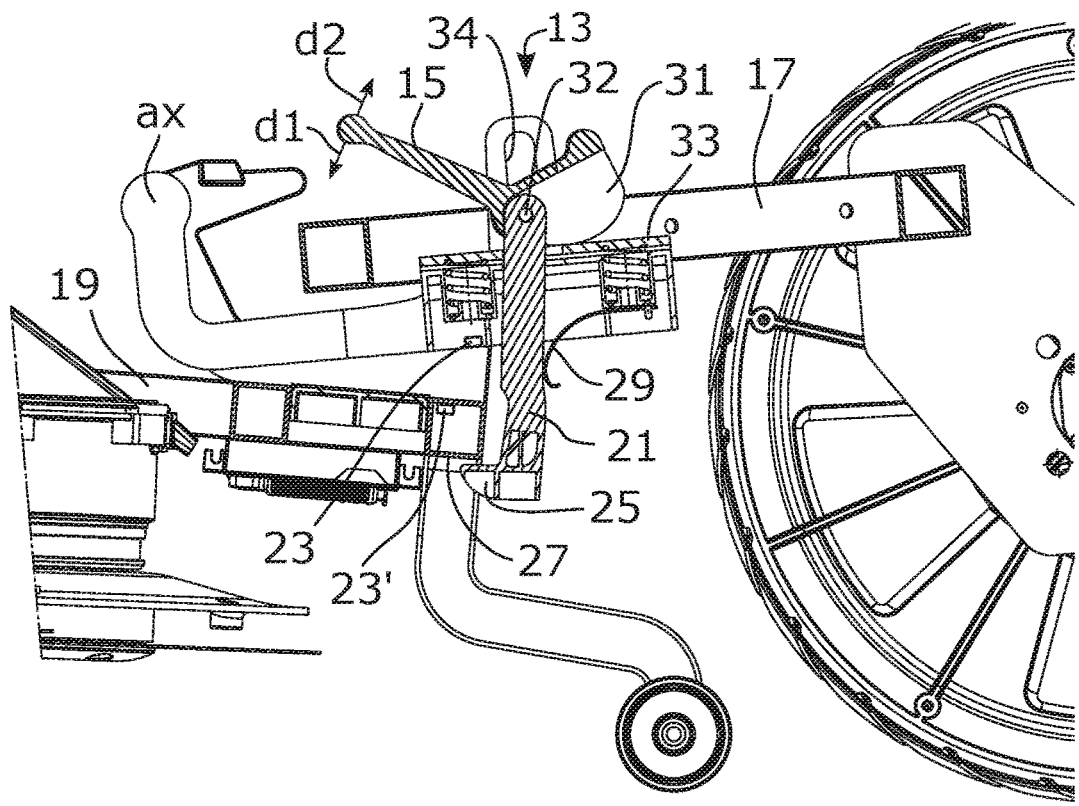
FIG. 7 illustrates the enlarged view of the locking mechanism illustrated in FIG. 6, where the actuator has been displaced a distance in a locking direction.

FIG. 7 illustrates the enlarged view of the locking mechanism 13 illustrated in FIG. 6, where the actuator 15 has been displaced a distance in a locking direction d2. According to the illustrated embodiments, the locking mechanism 13 is arranged to cause a movement of the locking member 21 towards the engagement portion 27 of the cutting unit chassis 19 upon displacement of the actuator 15 in the locking direction d2. That is, when the actuator 15 is displaced in the locking direction d2, the distance between the shaft 32 and the press element 33 increases due to the eccentricity of the eccentric 31. Accordingly, the shaft 32 moves in a direction from the ground surface, i.e. in a direction upwards in FIG. 7, when the actuator 15 is displaced in the locking direction d2. Since the locking member 21 is pivotally arranged to the shaft 32, the locking member 21 moves towards the engagement portion 27 of the cutting unit chassis 19 when the actuator 15 is displaced in the locking direction d2. Thus, a user may obtain engagement between the locking member 21 and the engagement portion 27 of the cutting unit chassis 19, when the cutting unit 7 is in the partially pivoted position, simply by applying a force onto the actuator 15 in the locking direction d2.

Moreover, as explained below, the locking mechanism 13 is arranged to pivot the cutting unit 7 from the partially pivoted position to the cutting position when the actuator 15 is further displaced in the locking direction d2 to a locking position.

Figure 8:
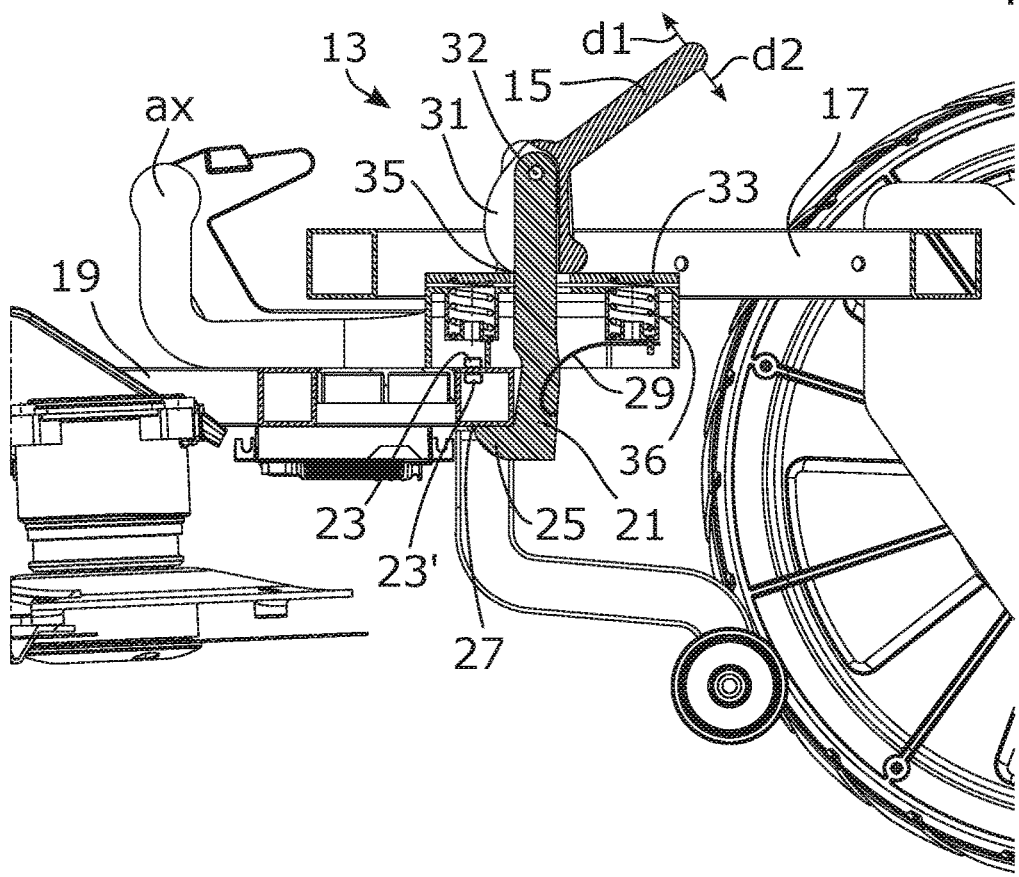
FIG. 8 illustrates the enlarged view of the locking mechanism illustrated in FIG. 6, where the actuator been displaced to a locking position.

FIG. 8 illustrates the enlarged view of the locking mechanism 13 illustrated in FIG. 6, where the actuator 15 has been displaced to the locking position. During displacement of the actuator 15 in the locking direction d2 towards the locking position, the eccentricity of the eccentric 31 causes the shaft 32 to move in a direction from the ground surface, i.e. in a direction upwards in FIG. 7. Since the locking member 21 engages the engagement portion 27 of the cutting unit chassis 19, the cutting unit 7 is pivoted to the cutting position when the actuator 15 is displaced in the locking direction d2 to the locking position. Thus, a user can pivot the cutting unit 7 to the cutting position simply by applying a force onto the actuator 15 in the locking direction d2. Moreover, due the eccentricity of the eccentric 31, a user can pivot the cutting unit 7 to the cutting position using less force than would be required otherwise. Furthermore, the need for lifting the cutting unit 7 by grabbing portions thereof is circumvented. Accordingly, due to these features, the user can pivot the cutting unit 7 to the cutting position in a more ergonomic manner.

Furthermore, as can be seen in FIG. 8, the eccentric 31 comprises a flat surface 35 arranged to abut against the press element 33 when the actuator 15 is in a locking position. In this manner, the actuator 15 is more securely held in the locking position and more force is required for displacing the actuator 15 from the locking position than what is required for displacing the actuator 15 to the locking position.

Moreover, since the press element 33 is spring biased towards the eccentric 31, a dampening effect is provided between the driving unit chassis 17 and the cutting unit chassis 19. In addition, since the press element 33 is spring biased towards the eccentric 31, the occurrence of play in the locking mechanism 13 is reduced and the impact of tolerances of components of the lawnmower is reduced.

According to some embodiments of the present disclosure, the eccentric 31 may comprise one or more wheels arranged to abut against the press element 33, wherein the one or more wheels are arranged to roll against the press element 33 upon displacement of the eccentric 31 relative the press element 33. In this manner, the locking mechanism 13 can be displaced between the locked state and the unlocked state using less force. Moreover, a user may displace the cutting unit 7 to and from the cutting position using less force. In addition, wear and tear of the eccentric 31 and of the press plate 33 can be reduced.

If a user wants to pivot the cutting unit 7 from the cutting position, illustrated in FIG. 8, the user may simply apply a force onto the actuator 15 in the unlocking direction d1 and displace the actuator 15 to the position illustrated in FIG. 7. As a result, the cutting unit is pivoted to the position illustrated in FIG. 7 due to gravity acting on the cutting unit 7. As can be seen in FIG. 7, the locking member 21 still engages the engagement portion 27 of the cutting unit chassis 19. In order to release the locking member 21 from the engagement portion 27 of the cutting unit chassis 19, the user may displace the actuator 15 further in the unlocking direction d1. As a result, the locking member 21 overcomes the biasing force of the spring element 29 and is displaced from the engagement portion 27 of the cutting unit chassis 19 into a position as is illustrated in FIG. 6.

Thus, according to the illustrated embodiments, the locking mechanism 13 is arranged such that a force is required onto the actuator 15 in the unlocking direction d1 for obtaining a release of the locking member 21 from the engagement portion 27 of the cutting unit chassis 19. In this manner, the cutting unit 7 can be pivoted to the pivoted position in a safer and more controlled manner.

Furthermore, as indicated in FIG. 7 and FIG. 8, the lawnmower 1 comprises a sensor 23. The sensor 23 is arranged to generate a signal indicating whether the cutting unit 7 is in the cutting position. According to the illustrated embodiments, the sensor 23 is arranged at the driving unit chassis 17 and is arranged to sense the magnetic field of a magnet 23' arranged at the cutting unit chassis 19. The sensor 23 may for example comprise a Hall sensor. When the cutting unit 7 is in the cutting position, as illustrated in FIG. 8, the magnet 23' is close to the sensor 23. Thereby, the sensor 23 can sense the magnetic field of the magnet 23' and generates a signal in response thereto. When the cutting unit 7 is not in the cutting position, as illustrated in FIG. 7, the magnet 23' is further away from the sensor 23. Thereby, the sensor 23 is not able to sense the magnetic field of the magnet 23' and generates no signal. Thus, due to these features, a simple, safe, and reliable detection is provided of whether the cutting unit 7 is in the cutting position or not. According to further embodiments, the lawnmower 1 may comprise another type of sensor 23, such as an electrical switch, or the like.

Moreover, as indicated in FIG. 1, the lawnmower 1 comprises a control unit 49 configured to control operation of the cutting unit 7. The control unit 49 is configured to render the cutting unit 7 inoperable when the cutting unit 7 is not in the cutting position. Accordingly, the control unit 49 is configured to operate the cutting unit 7 only when the cutting unit is in the cutting position, which significantly improves safety of the handling of the lawnmower 1.

As indicated in FIG. 5, the lawnmower 1 comprises a spring element 41. The spring element 41 is arranged to bias the cutting unit 7 from the partially pivoted position towards the pivoted position illustrated in FIG. 5. In this manner, the cutting unit 7 can be pivoted from the partially pivoted position to the pivoted position using less force. Moreover, the cutting unit 7 can be pivoted from the pivoted position to the partially pivoted position in a more controlled and ergonomic manner. The lawnmower 1 may comprise more than one spring element 41, such as two spring elements 41. Moreover, the one or more spring elements 41 may be provided with a dampening function dampening pivoting movement of the cutting unit 7. In this manner, the cutting unit 7 can be pivoted in a more controlled and ergonomic manner.

Figure 9:
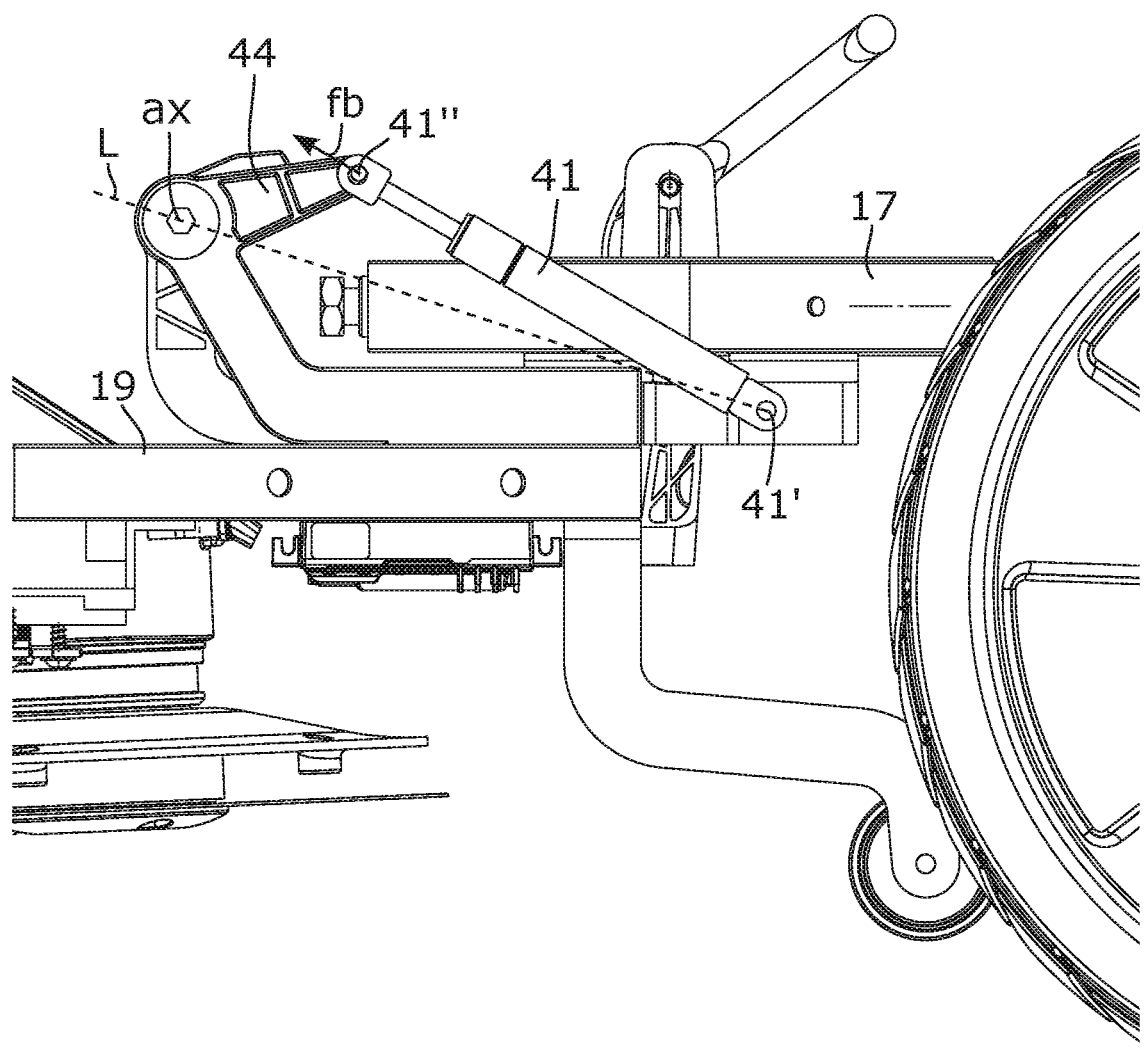
FIG. 9 illustrates an enlarged view of a spring element of the lawnmower.

FIG. 9 illustrates an enlarged view of a spring element 41 of the lawnmower 1. According to the illustrated embodiments, the spring element 41 comprises a gas spring. Moreover, a first end 41' of the spring element 41 is pivotally attached to the driving unit chassis 17. A second end 41" of the spring element 41 is pivotally attached to a portion of an arm 44. The arm 44 is rigidly attached to the cutting unit chassis 19 and is arranged such that the arm 44 is rotated around the pivot axis ax when the cutting unit 7 is pivoted around the pivot axis ax. The spring element 41 applies a biasing force fb between the respective attachment portions of the first and second ends 41', 41". The arm 44 and the attachment portions of the spring element 41 are adapted such that the first and second ends 41', 41" of the spring element 41 and the pivot axis ax are aligned, i.e. are positioned along a line L, when the cutting unit 7 is in the partially pivoted position. Thus, when in this position, the direction of the biasing force fb substantially coincides with a line L drawn between the first and second ends 41', 41" of the spring element 41 and the pivot axis ax. Moreover, the arm 44 and the attachment portions of the spring element 41 are adapted such that the distance between the first and second ends 41', 41" increases when the cutting unit 7 is pivoted from the partially pivoted position to the cutting position, as well as when the cutting unit 7 is pivoted from the partially pivoted position to the pivoted position.

In this manner, the spring element 41 will bias, i.e. assist displacement of, the cutting unit 7 from the partially pivoted position to the pivoted position, as well as will bias, i.e. assist displacement of, the cutting unit 7 from the partially pivoted position to the cutting position. Thus, due to the spring element 41, a user can pivot the cutting unit 7 from the partially pivoted position towards the cutting position, and from the partially pivoted position towards the pivoted position, using less force.

The wording "substantially parallel to", as used herein, may encompass that the angle between the objects referred to is less than 7 degrees. The wording "substantially perpendicular to", as used herein, may encompass that the angle between the objects referred to is within the range of 83-97 degrees.

The forward direction fd of travel, as referred to herein, is the direction of travel obtained when the lawnmower 1 is travelling straight in an intended forward direction.

As mentioned, the lawnmower 1 comprises at least one sensor 47 and a control unit 49, wherein the control unit 49 is configured to control operation of the driving unit 3, based on data from the at least one sensor 47, to navigate the lawnmower 1 in an area. According to the illustrated embodiments, the sensor 47 is an antenna used to communicate with a remote communication unit to receive instructions therefrom and/or to send information thereto. The communication may be performed wirelessly over a wireless connection such as the internet, or a wireless local area network (WLAN), or a wireless connection for exchanging data over short distances using short-wavelength, i.e. ultra-high frequency (UHF) radio waves in the industrial, scientific and medical (ISM) band from 2.4 to 2.485 GHz. In addition, the lawnmower 1 may further comprise one or more sensors arranged to sense a magnetic field of a wire, and/or one or more positioning units, and/or one or more sensors arranged to detect an impending or ongoing collision event with an object.

The lawnmower 1 may comprise one or more batteries arranged to supply electricity to electrical components of the lawnmower 1, such as motors of the driving unit 3, motors of the cutting unit 7, and/or to the control unit 49.

As mentioned, the control unit 49 is configured to control operation of the driving unit 3 by controlling electrical motors arranged to rotate the drive wheels 5. The control unit 49 may be configured to steer the lawnmower 1 by selectivity controlling torque and/or rotational speed of drive wheels 5 at different lateral sides of the lawnmower 1. In such embodiments, the lawnmower 1 will turn to the left if the drive wheel on a right side of the lawnmower 1 is controlled to a higher torque and/or rotational speed than the drive wheel on the left side of the lawnmower 1, and vice versa. In this manner, the lawnmower 1 can be steered and navigated in an autonomous manner in an area without intervention of a user.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions or groups thereof.

The invention claimed is:

1. An autonomous robotic lawnmower comprising:
a driving unit comprising one or more drive wheels, and
a cutting unit arranged to cut grass when in a cutting position relative a ground surface,
wherein the lawnmower comprises a folding mechanism allowing the cutting unit to be pivoted relative the driving unit around a pivot axis from the cutting position to a pivoted position,
wherein the lawnmower comprises a locking mechanism arranged to, in a locked state, lock the cutting unit in the cutting position, and in an unlocked state, allow the cutting unit to be pivoted relative the driving unit,
and wherein the lawnmower comprises an actuator operably connected to the locking mechanism to control the locking mechanism between the locked state and the unlocked state, and
wherein the locking mechanism comprises an eccentric, and wherein the actuator is operably connected to the locking member via the eccentric.

2. The lawnmower according to claim 1, wherein the cutting unit is arranged to cut grass in a cutting plane, and wherein the pivot axis is transversal to a second plane being perpendicular to the cutting plane.

3. The lawnmower according to claim 2, wherein the pivot axis is substantially parallel to the cutting plane, or
wherein the pivot axis is substantially perpendicular to a forward direction of travel of the lawnmower.

4. The lawnmower according to claim 1, wherein the folding mechanism allows the cutting unit to be pivoted relative the driving unit around the pivot axis with an angle exceeding 45 degrees, or
wherein all wheels of the driving unit, which are arranged to abut against a ground surface, are arranged along one axis.

5. The lawnmower according to claim 1, wherein the locking mechanism is arranged at a distance from the pivot axis, or
wherein the locking mechanism is arranged on a driving unit side of the pivot axis.

6. The lawnmower according to claim 1,
wherein the actuator is operably connected to the locking mechanism in a manner causing the locking mechanism to be transferred from the locked state to the unlocked state when a force is applied onto the actuator in a direction coinciding with a forward direction of travel of the lawnmower.

7. The lawnmower according to claim 1, wherein the lawnmower comprises a driving unit chassis and a cutting unit chassis, and wherein the locking mechanism comprises a locking member arranged on one of the driving unit chassis and the cutting unit chassis, and wherein the locking member is arranged to abut against an engagement portion of the other of the driving unit chassis and the cutting unit chassis when the locking mechanism is in the locked state.

8. The lawnmower according to claim 7, wherein the locking member comprises a hook, or
wherein the locking member is arranged on the driving unit chassis.

9. The lawnmower according to claim 7, wherein the locking mechanism is arranged to cause a movement of the locking member from the engagement portion upon displacement of the actuator in an unlocking direction, and
wherein the locking mechanism is arranged to cause a movement of the locking member towards the engagement portion upon displacement of the actuator in a locking direction.

10. The lawnmower according to claim 7, wherein the locking mechanism comprises a spring element arranged to bias the locking member towards the engagement portion.

11. The lawnmower according to claim 1, wherein the actuator is rigidly attached to the eccentric, or
wherein the lawnmower comprises a handle arranged on a front portion of the cutting unit.

12. The lawnmower according to claim 1, wherein the locking mechanism comprises a press element against which the eccentric is arranged to press, and wherein the eccentric comprises a flat surface arranged to abut against the press element when the actuator is in a locking position or the press element is spring biased towards the eccentric.

13. The lawnmower according to claim 1, wherein the lawnmower comprises a sensor arranged to generate a signal indicating whether the cutting unit is in the cutting position.

14. The lawnmower according to claim 13, wherein the lawnmower comprises a control unit configured to control operation of the cutting unit, wherein the control unit is configured to render the cutting unit inoperable when the cutting unit is not in the cutting position.

15. The lawnmower according to claim 1, wherein the lawnmower comprises a support arm arranged to abut against a ground surface when the cutting unit is in an at least partially pivoted position.

16. The lawnmower according to claim 15, wherein the support arm is arranged on the cutting unit, and
wherein the support arm is arranged to abut against the ground surface during pivoting of the cutting unit from a partially pivoted position to the pivoted position, or
wherein the support arm comprises a wheel.

17. The lawnmower according to claim 15, wherein the support arm is arranged to abut against the ground surface when the cutting unit is in the pivoted position to prevent the cutting unit from being displaced from the pivoted position.

18. The lawnmower according to claim 1, wherein the lawnmower comprises one or more spring elements arranged to bias the cutting unit from a partially pivoted position towards the pivoted position, and
wherein the one or more spring elements are further arranged to bias the cutting unit from the partially pivoted position towards the cutting position.

19. The lawnmower according to claim 1, wherein the lawnmower comprises at least one sensor and a control unit, and wherein the control unit is configured to control operation of the driving unit, based on data from the at least one sensor, to navigate the lawnmower in an area.

* * * * *